Figures 1, 2, 3:
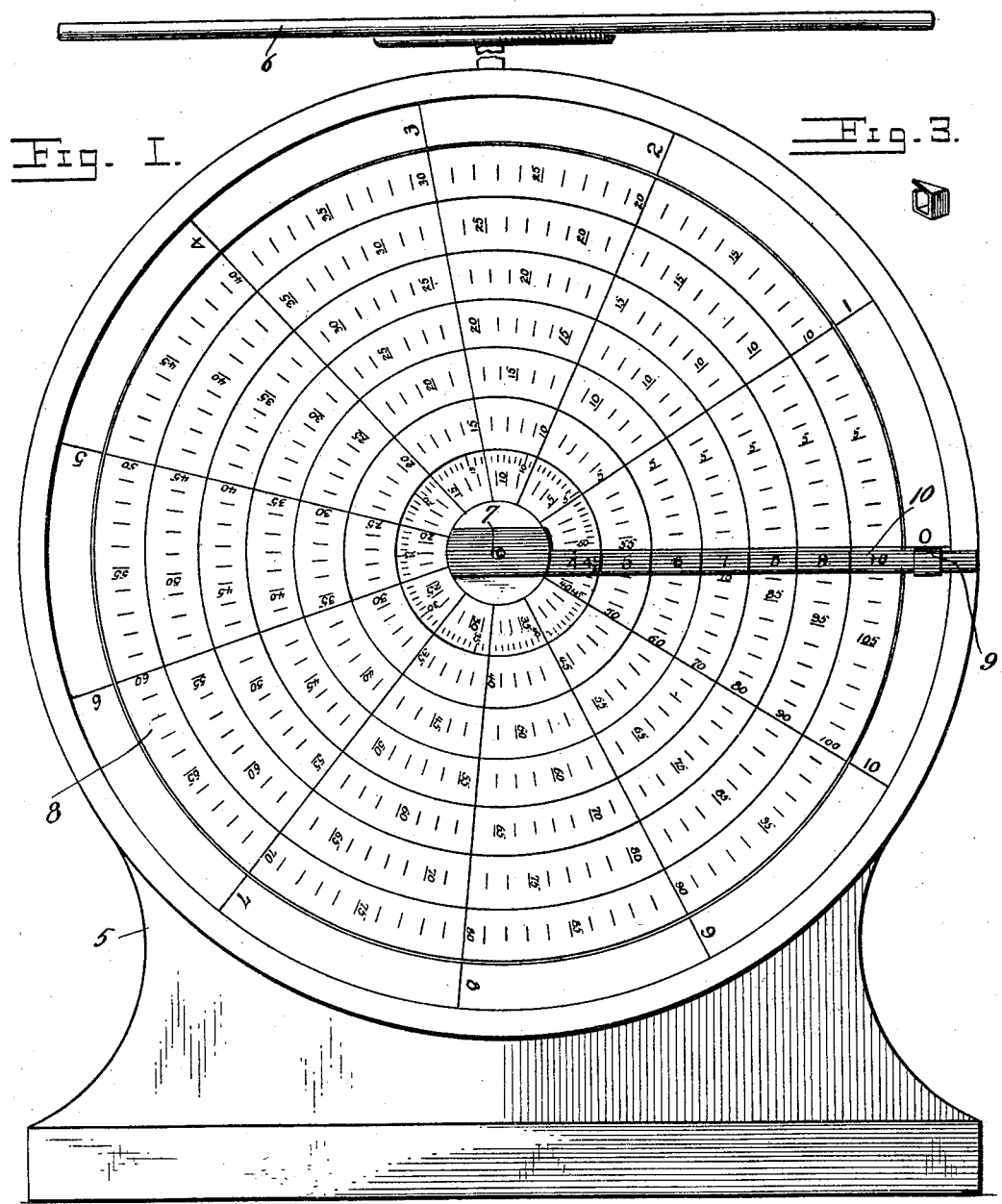

No. 679,795. Patented Aug. 6, 1901.
L. B. THOMAS.
COMPUTING SCALE DIAL.
(Application filed Dec. 6, 1900.)
(No Model.)

Witnesses  
F. E. Alden.  
Geo. H. Chandlee.

L. B. Thomas, Inventor.  
by C. A. Snow & Co.,  
Attorneys.

UNITED STATES PATENT OFFICE.

LUTHER B. THOMAS, OF RINGGOLD, LOUISIANA.

COMPUTING-SCALE DIAL.

SPECIFICATION forming part of Letters Patent No. 679,795, dated August 6, 1901.

Application filed December 6, 1900. Serial No. 38,924. (No model.)

*To all whom it may concern:*

Be it known that I, LUTHER B. THOMAS, a citizen of the United States, residing at Ringgold, in the parish of Bienville and State of Louisiana, have invented a new and useful Computing-Scale, of which the following is a specification.

This invention relates to computing-scales in general, and more particularly to the dial and index thereof, one object of the invention being to provide a simple and cheap form of dial and index that may be used in connection with a common form of scale having a rotatable indicating element.

A further object of the invention is to provide such an index and a dial that the price of any quantity of material weighed may be readily determined.

Further objects and advantages of the invention will be evident from the following description.

In the drawings forming a portion of this specification, and in which like numerals of reference indicate similar parts in the several views, Figure 1 is an elevation showing a common form of spring-scale provided with an index and dial constructed in accordance with the present invention. Fig. 2 is a view showing a portion of the frame of the scale in section and showing the upper edge of the dial and the index with its movable finger in elevation. Fig. 3 is a perspective view showing the movable finger on the index-arm.

Referring now to the drawings, 5 represents the casing of an ordinary spring-scale, wherein when the platform 6 is depressed a shaft 7 is caused to rotate, this shaft in the usual construction carrying an index. In the present instance instead of the index being rotatable a dial 8 is mounted upon the shaft for rotation thereby, while the index 9, which is in the form of a finger, is carried by a fixed index-arm 10, which extends radially of the dial, with its inner end at the center of the dial and its outer end connected to the frame or casing of the scales.

The supporting index-arm is supported idly at its inner end upon the shaft of the scales and is preferably rectangular in cross-section, and upon this arm the finger 9 is slidably mounted, said finger being in the form of a metallic strip having one end tapered to a point, and this strip is bent around the arm, with its tapered end projecting transversely of the upper edge of the arm and in the direction of the dial. It will be noted that the pointed end of the strip is free from the under side of the strip, so that it may be sprung outwardly to permit of application of the strip to the arm, after which the pointed end may be permitted to spring back to frictionally hold the strip against displacement, while permitting it to be adjusted when desired. The arm 10 is marked with a series of numbers, in the present instance beginning with "4" at the inner end of the arm and ending with "10" at the outer end of the arm, and these index-numbers indicate the prices per pound of the different articles to be weighed from four cents to ten cents, and by shifting the index-finger to cover a number on the arm the finger is brought to proper position for use in calculating the prices of different numbers of pounds as the price per pound shown by the number covered.

The dial instead of being marked with numbers successively is marked only with five and multiples thereof, the manner of determining the intervening amounts being evident from the following description.

The present dial is marked to determine the prices of different quantities up to and including ten pounds, and for this reason the dial is divided into eleven sector-shaped divisions by eleven radial and equidistant lines, these lines being marked at their outer ends beginning with "0" and ending with "10." Upon the dial are also drawn eight circles of constantly-increasing radii and concentric with the dial, and these circles, as they intersect the index-arm 9, divide the latter into seven parts, in which are marked the prices per pound, as above mentioned. These circles divide the dial into seven annular columns. The columns may be referred to by their respective price markings on the index-arm, and it will be noted that the four-cent column is divided in each of its arcs between the radial lines into four equal parts, the five-cent column is divided into five parts, the six-cent column into six parts, and so on through the succeeding columns.

Beginning with the line marked "0" and counting to the left, the fifth divisional line in each column is marked "5," the tenth divisional line is marked "10," and each succeeding line that is a multiple of five is marked with its number, so that each column is divided into groups of five spaces by these numbers, and these numbers are what may be termed "value markings."

The operation of the apparatus is as follows: The dial normally stands in the position shown—that is, with the line marked "0" just appearing at the upper edge of the dial-arm 9. Supposing, then, that rice is to be sold at five cents per pound and two pounds are to be sold, the rice is placed upon the platform of the scales in the usual manner, and by the mechanism of the scales the shaft 7 is rotated, a sufficient quantity of rice being placed on the scale to bring the dial in position for the line marked "2" to lie in the present position of the line "0." The index-finger has been previously slid along the arm 9 to cover the number "5," and it will be found that the finger is then pointing to the figure "10" on the dial. Supposing two pounds of a different commodity is to be sold at eight cents per pound, the dial-finger is moved to cover the figure "8," the dial, of course, moved to the same position as in the former instance. There is no figure on the line "2" at this point, but the fourth line above is marked "20," and by counting back these four lines the value of the line "2" at this point—i. e., sixteen cents—is readily determined. The question naturally arises: Why should the lines themselves not be marked with their proper values instead of requiring this back counting? The reason for this is that a merchant is often called upon to sell five cents' worth of a commodity or a multiple of five cents' worth when the commodity sells at from four or less cents per pound to ten or more cents per pound, and by marking the dial with multiples of five only such markings are more distinct. The present scales are made to include from four cents per pound to ten cents per pound, as before stated. Now suppose that a customer wishes twenty cents' worth of lard at six cents per pound. The lard is put on the scale, after first moving the index to the six-cent mark, and a sufficient quantity is added until the number "20" in the six-cent column comes down to the index, thus weighing out three and two-sixths pounds. The same result is secured in each instance wherever the index may be placed to show the price per pound, and the unnumbered markings may be used for reckoning prices between the multiples of five.

In addition to the columns of figures above mentioned the arm may be marked with the half-cents and corresponding columns of figures used, an instance of such marking being shown with the four-and-one-half-cent marking on the arm. In this event the half-cent markings on the arm and in their respective columns are made with a different-colored ink to distinguish them more clearly.

What is claimed is—

In a computing-scale, the combination with a scale-pan and a dial operably connected therewith for rotation thereby, said dial having weight and value markings thereon, of an arm fixed against movement and disposed radially of the dial, said arm having rate markings thereon and an index for the arm consisting of a metal strip having one end pointed, said strip being bent into rectangular form with its pointed end projecting beyond the adjacent side and free from the latter whereby it may be sprung outwardly to engage the strip over the arm and may hold the strip at different points of the length of the arm.

In testimony that I claim the foregoing as my own I have hereto affixed my signature in the presence of two witnesses.

LUTHER B. THOMAS.

Witnesses:
W. T. CRONEY,
D. C. THOMAS.